(12) United States Patent
Covington

(10) Patent No.: US 12,569,750 B1
(45) Date of Patent: Mar. 10, 2026

(54) DOMINOS LIVE ACTION GAMING TABLE

(71) Applicant: Anthony Bennett Covington,
Winchester, CA (US)

(72) Inventor: Anthony Bennett Covington,
Winchester, CA (US)

( * ) Notice: Subject to any disclaimer, the term of this
patent is extended or adjusted under 35
U.S.C. 154(b) by 0 days.

(21) Appl. No.: 18/932,594

(22) Filed: Oct. 30, 2024

(51) Int. Cl.
| | |
|---|---|
| *A63F 9/20* | (2006.01) |
| *A47B 13/12* | (2006.01) |
| *A63F 1/00* | (2006.01) |
| *A63F 1/06* | (2006.01) |
| *A63F 13/86* | (2014.01) |

(52) U.S. Cl.
CPC .............. *A63F 9/20* (2013.01); *A47B 13/12*
(2013.01); *A63F 1/067* (2013.01); *A63F*
*2001/006* (2013.01); *A63F 13/86* (2014.09)

(58) Field of Classification Search
CPC .. A63F 9/20; A63F 1/067; A63F 13/86; A63F
2001/006; A47B 13/12
See application file for complete search history.

(56) References Cited

U.S. PATENT DOCUMENTS

| | | | | |
|---|---|---|---|---|
| 3,402,635 A * | 9/1968 | Jacknau | .............. | G03B 27/465 |
| | | | | 355/64 |
| 4,923,200 A * | 5/1990 | Peterson | ................... | A63F 1/06 |
| | | | | 273/144 A |
| 7,727,060 B2 * | 6/2010 | Mills | ....................... | A63F 1/067 |
| | | | | 463/40 |
| 10,607,436 B1 * | 3/2020 | Blazevic | ................ | A63F 13/90 |
| 11,213,740 B1 * | 1/2022 | Loane | ................ | G07F 17/3276 |
| 2007/0052167 A1 * | 3/2007 | Galatan | .................... | A63F 1/06 |
| | | | | 463/40 |
| 2017/0173459 A1 * | 6/2017 | Mills | ....................... | A63F 13/80 |

* cited by examiner

*Primary Examiner* — Michael D Dennis
(74) *Attorney, Agent, or Firm* — Fargo Patent & Business
Law; Thomas Kading

(57) ABSTRACT

A gaming table includes a playing surface; and a window
adjacent an edge of the playing surface, the window com-
prised of a first portion and a second portion, the second
portion at an apex of the first portion.

8 Claims, 3 Drawing Sheets

DOMINOS LIVE ACTION GAMING TABLE

CROSS REFERENCE TO RELATED APPLICATION[S]

None

BACKGROUND

The present disclosure relates to a gaming table, and more specifically to a gaming table to facilitate spectator viewing of a dominos game.

Dominos is a family of tile-based games played with gaming pieces. Each domino is a rectangular tile, usually with a line dividing its face into two square ends. Each end is marked with a number of spots (also called pips or dots) or is blank. The backs of the tiles in a set are indistinguishable, either blank or having some common design. The gaming pieces make up a domino set, sometimes called a deck or pack. The traditional European domino set consists of 28 tiles, also known as pieces, bones, rocks, stones, men, cards or just dominos, featuring all combinations of spot counts between zero and six.

This background section is intended to introduce the reader to various aspects of art that may be related to various aspects of the present disclosure, which are described and/or claimed below. This discussion is believed to assist the reader with background information to facilitate a better understanding of the various aspects of the present disclosure. Accordingly, it should be understood that these statements are to be read in this light, and not as admissions of prior art.

SUMMARY

A gaming table according to one disclosed non-limiting embodiment of the present disclosure includes a playing surface; and a window adjacent an edge of the playing surface, the window comprised of a first portion and a second portion, the second portion at an apex of the first portion.

A further embodiment of any of the foregoing embodiments of the present disclosure includes a window adjacent each edge of the playing surface.

A further embodiment of any of the foregoing embodiments of the present disclosure includes that the first portion is a semi-circular portion and the second portion is a rectilinear portion.

A further embodiment of any of the foregoing embodiments of the present disclosure includes a camera that is directed to provide a view through each window.

A further embodiment of any of the foregoing embodiments of the present disclosure includes that each camera is located below the playing surface.

A further embodiment of any of the foregoing embodiments of the present disclosure includes a support to locate a camera above the playing surface.

A gaming table according to one disclosed non-limiting embodiment of the present disclosure includes a playing surface; a window adjacent each edge of the playing surface, the window comprised of a semi-circular portion and a rectilinear portion, the rectilinear portion at an apex of the semi-circular portion; a camera that is directed through each window, each camera is located below the playing surface; and a support to locate a camera above the playing surface.

A further embodiment of any of the foregoing embodiments of the present disclosure includes a live stream system to receive data from each camera.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
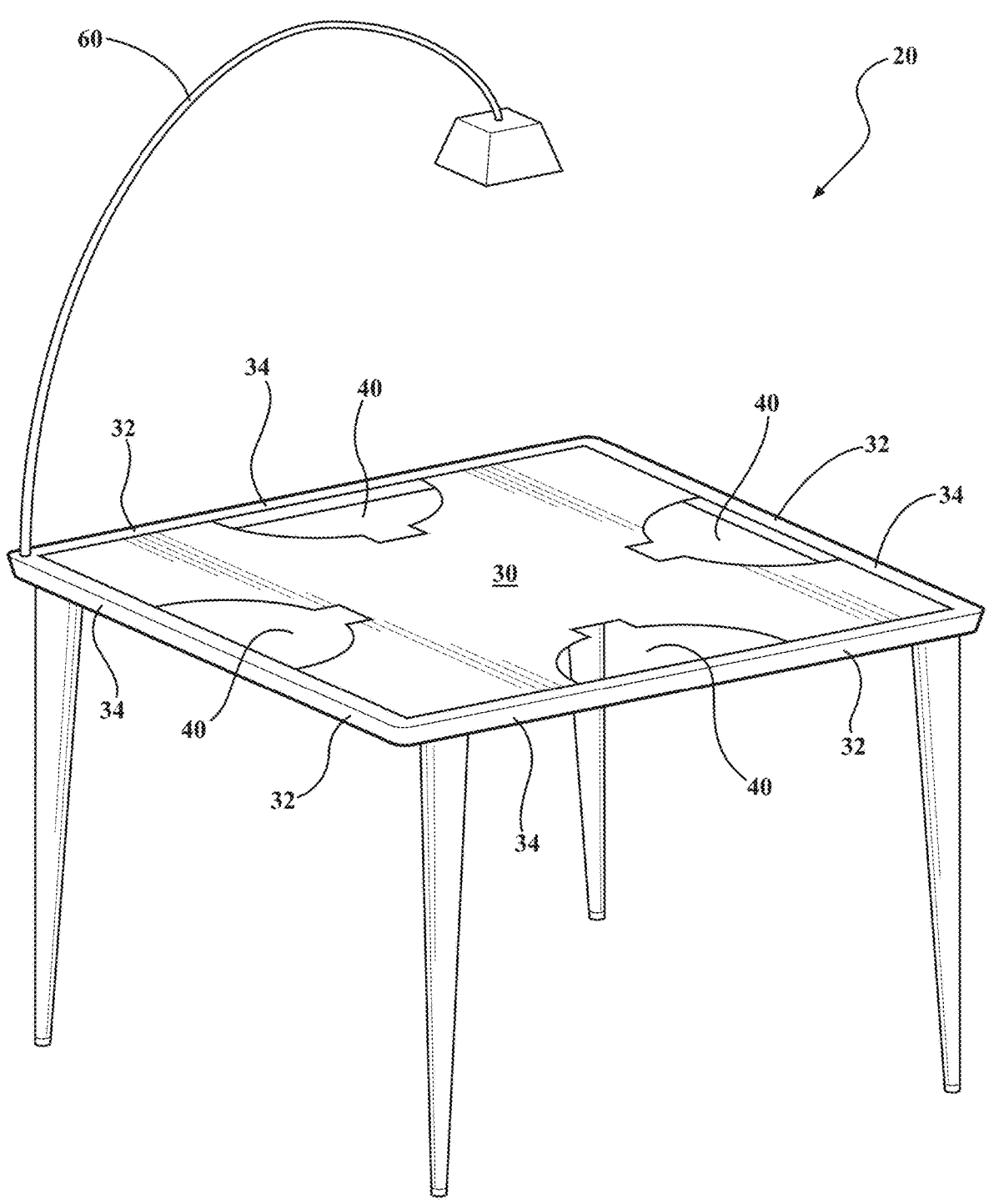
FIG. 1 is a perspective view of a gaming table according to one disclosed non-limiting embodiment.

FIG. 1 schematically illustrates a gaming table 20. The gaming table 20 may be particularly suitable to facilitate spectator viewership of a table top type game such as dominos, rummy, spades, etc. Dominos is a fast pace strategic game that is interesting to watch and may be learned from watching others.

Figure 2:
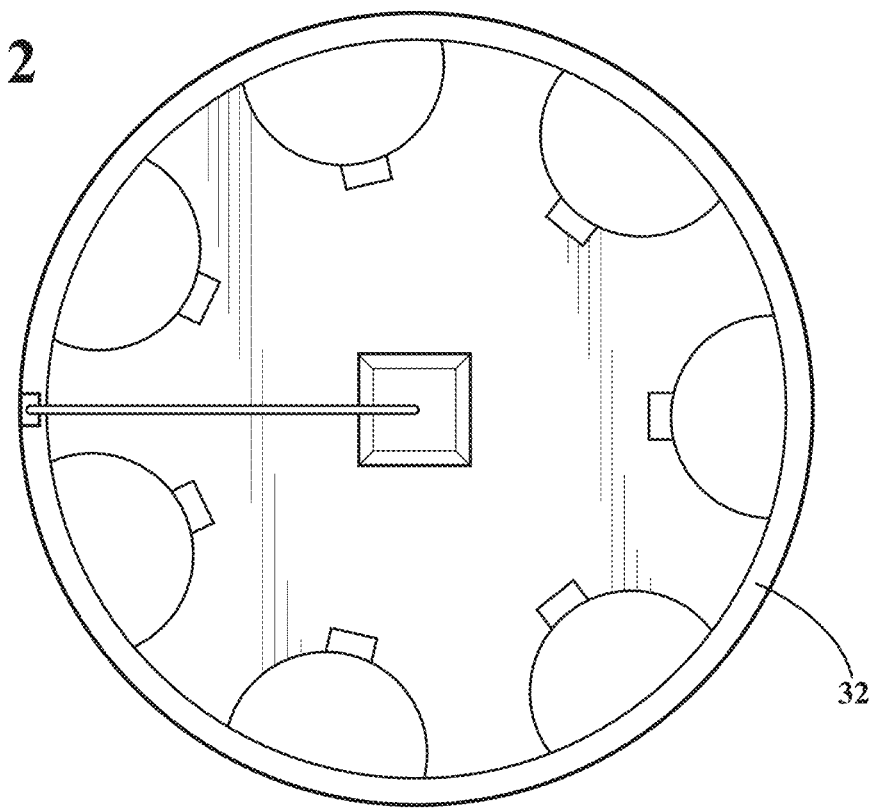
FIG. 2 is a top view of the gaming table according to another disclosed non-limiting embodiment.

The gaming table 20 generally includes a playing surface 30 with an edge 32 and a window 40 adjacent at least one, or each edge 32. The edge is defined herein as the outside limit of the playing surface 30 or part farthest away from the center of the playing surface 30. A bumper 34 of other surface may also be provided, for example, to provide a comfortable rest for a player at the table 20. Although the table 20 may be rectilinear with, for example, four edges 32 as disclosed in this illustrated embodiment, other gaming tables that are round (FIG. 2) with one edge, or have other numbers of sides, e.g., 3, 5, 6, 7, 8, etc., may also benefit herefrom. In one embodiment the gaming table 20 may 5 feet×5 feet in size.

Figure 3:
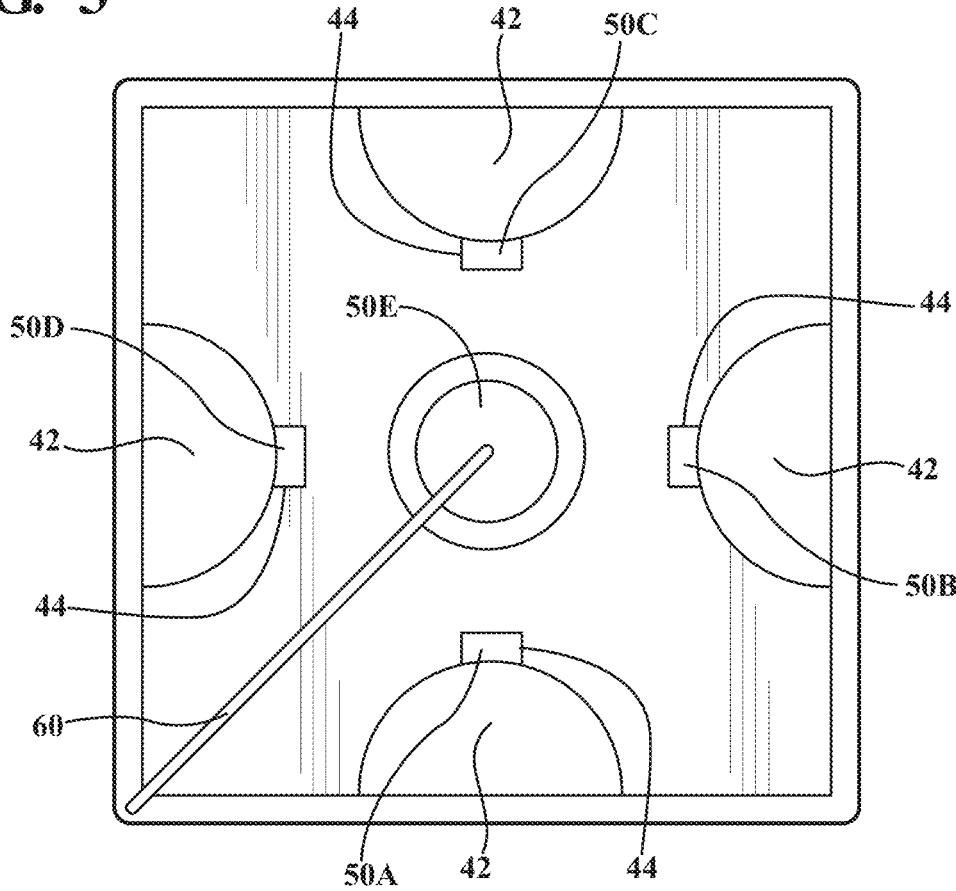
FIG. 3 is a top view of the gaming table of FIG. 1.

With reference to FIG. 3, each window 40 generally includes a semi-circular portion 42 and a rectilinear portion 44 at an apex of the semi-circular portion 42. The shape of the window 40 is thereby particularly tailored to that of a dominos game.

Figure 4:
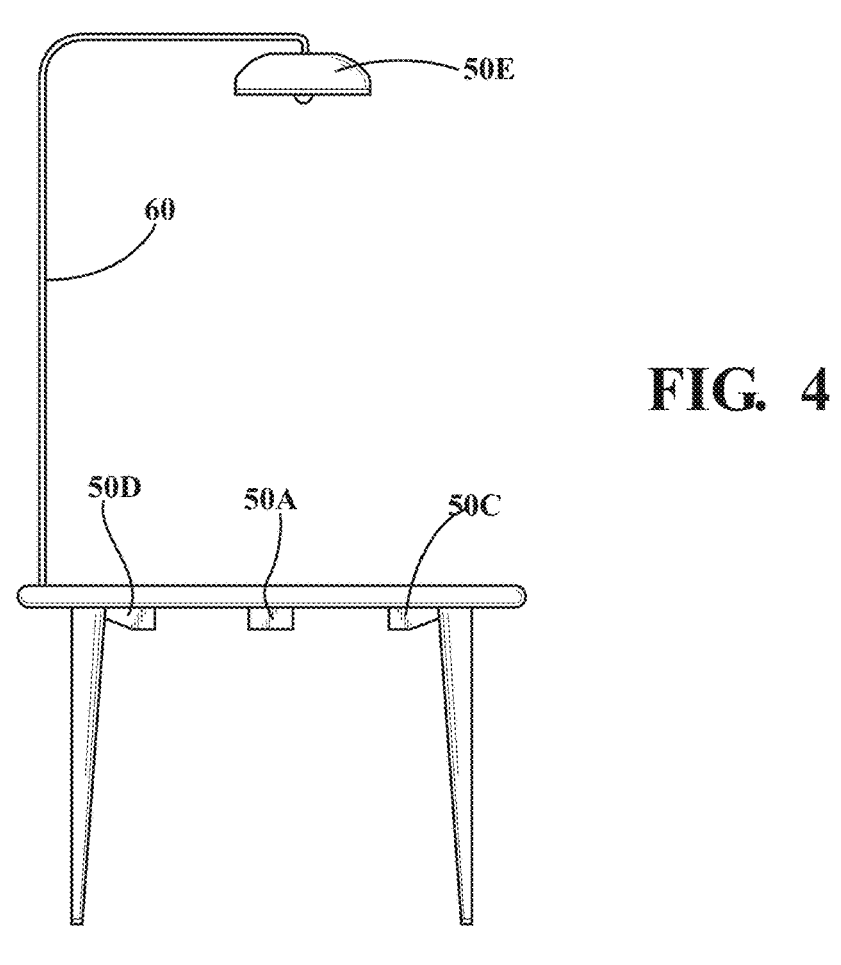
FIG. 4 is a side view of the gaming table of FIG. 1.

The window 40 may be manufactured of a transparent material such as high tempered glass, plastic, etc. The window 40 may additionally be manufactured of a one-way transparent material to permit one or more cameras (four shown 50A-50D; FIG. 4) to be located below the playing surface to provide a view upwards through each associated window 40.

A camera mount 60 may additionally be provided to locate a camera 50E above the playing surface 30. The camera mount 60 may extend from a corner of the playing surface 30 or be otherwise located to permit an overall downward view of the playing surface 30.

Figure 5:
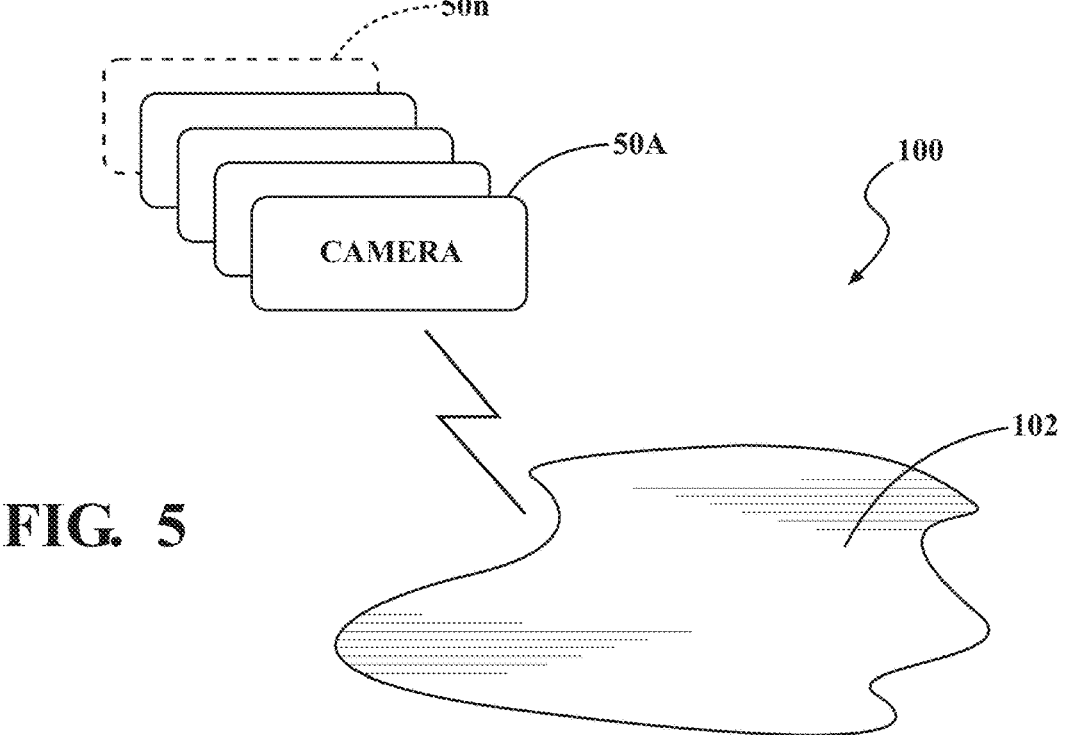
FIG. 5 is a schematic view of a live stream system for the gaming table according to one disclosed non-limiting embodiment.

With reference to FIG. 5, in one embodiment, a live stream system 100 may include a cloud-based system 102 with servers, data processing devices, computers, etc., that receives data from each camera 50A-50E to capture and or record live play. Each camera 50A-50E may be a wi-fi type camera that facilitates live streaming, play-back, recording, etc., to play and/or record for rebroadcast or training purposes.

In other embodiments, the playing pieces, e.g., domino tiles are RFID chipped to communicate with a receiver on the gaming table 20 to facilitate capture of live play.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A gaming table, comprising:
a playing surface; and
a multiple of windows, each one of the multiple of windows adjacent an edge of the playing surface, the window consisting of a first portion and a second portion, the second portion at an apex of the first portion, wherein the first portion consists of a semi-circular portion adjacent the edge of the playing surface and the second portion consisting of a rectilinear portion at an apex of the semi-circular portion toward a center of the playing surface, wherein each rectilinear portions is smaller in area than the adjacent semi-circular portions.

2. The gaming table as recited in claim 1, further comprising a multiple of cameras, each one of the multiple of cameras directed to provide a view through the respective rectilinear portion of one window.

3. The gaming table as recited in claim 2, wherein each camera is located below the playing surface.

4. The gaming table as recited in claim 3, further comprising a support to locate a camera above the playing surface.

5. A gaming table, comprising:
a playing surface with a multiple of edges;
a multiple of windows, each one of the multiple of windows adjacent one respective edge of the playing surface, the window consisting of a semi-circular portion and a rectilinear portion, the rectilinear portion at an apex of the semi-circular portion, the semi-circular portion toward a center of the playing surface with respect to the edge;
a multiple of cameras, each one of the multiple of cameras is directed through one of the multiple of windows, each camera is located below the playing surface;
a support to locate a camera above the playing surface; and
a live stream system to receive data from each camera.

6. The gaming table as recited in claim 5, wherein the camera above the playing surface is centered above the table.

7. A gaming table for a dominos game, comprising:
a rectilinear playing surface with a multiple of linear edges;
a multiple of windows, each one of the multiple of windows adjacent one respective linear edge of the playing surface, the window consisting of a semi-circular portion and a rectilinear portion, the rectilinear portion at an apex of the—semi-circular portion, the semi-circular portion toward a center of the playing surface with respect to the linear edge, wherein each of the semi-circular portions comprise a linear portion along the linear edge;
a multiple of cameras, each one of the multiple of cameras is directed through one of the multiple of windows, each camera is located below the playing surface;
a support to locate a camera above the playing surface; and
a live stream system to receive data from each camera.

8. The gaming table as recited in claim 7, wherein each of the rectilinear portions is smaller in area than the adjacent semi-circular portions.

\* \* \* \* \*